(12) United States Patent
Hashimoto

(10) Patent No.: US 9,541,739 B2
(45) Date of Patent: *Jan. 10, 2017

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,568

(22) Filed: Feb. 10, 2016

(65) Prior Publication Data

US 2016/0154215 A1    Jun. 2, 2016

Related U.S. Application Data

(63) Continuation of application No. 14/573,305, filed on Dec. 17, 2014, now Pat. No. 9,261,675.

(30) Foreign Application Priority Data

Jul. 14, 2014 (JP) ................. 2014-144452

(51) Int. Cl.
*G02B 13/18* (2006.01)
*G02B 9/60* (2006.01)
*G02B 13/00* (2006.01)
*G02B 27/00* (2006.01)

(52) U.S. Cl.
CPC ............. *G02B 13/0045* (2013.01); *G02B 9/60* (2013.01); *G02B 13/18* (2013.01); *G02B 27/0025* (2013.01)

(58) Field of Classification Search
CPC .............................. G02B 13/0045; G02B 9/60
USPC .................................................. 359/713, 714
See application file for complete search history.

(56) References Cited

U.S. PATENT DOCUMENTS 9,261,675 B2 *  2/2016  Hashimoto ........ G02B 13/0045
2012/0229920 A1   9/2012  Otsu et al.
2012/0293682 A1  11/2012  Ohtsu
2013/0242412 A1   9/2013  Uchida et al.
2014/0139698 A1   5/2014  Fukuta et al.
(Continued)

FOREIGN PATENT DOCUMENTS

JP          2011-85733          4/2011

*Primary Examiner* — Scott J Sugarman
(74) *Attorney, Agent, or Firm* — Oliff PLC

(57) ABSTRACT

A compact, low-profile, low-cost imaging lens with brightness of F-value 2.5 or less and a wide field of view, which corrects aberrations properly. Elements are arranged from an object side: an aperture stop, positive first lens having a convex object-side surface, negative biconcave second lens having concave object-side and image-side surfaces, positive or negative third lens having a convex object-side surface and at least one aspheric surface; positive meniscus double-sided aspheric fourth lens having a convex image-side surface; and negative double-sided aspheric fifth lens having a concave image-side surface. The fifth lens' aspheric image-side surface has a pole-change point off an optical axis, and the imaging lens satisfies the following conditional expressions:

$$TTL/2ih \leq 0.8 \tag{1}$$

$$1.60 < Nd3 < 1.70 \tag{2}$$

$$4.0 < |r9/r10| < 14.0 \tag{3}$$

where
TTL: total track length
ih: maximum image height
Nd3: third lens refractive index at d-ray
r9: curvature radius of the fifth lens object-side surface
r10: curvature radius of the fifth lens image-side surface.

17 Claims, 10 Drawing Sheets

(56) References Cited

U.S. PATENT DOCUMENTS

| | | |
|---|---|---|
| 2014/0293453 A1 | 10/2014 | Ogino et al. |
| 2014/0320984 A1 | 10/2014 | Kubota et al. |
| 2014/0355134 A1 | 12/2014 | Sekine |
| 2015/0198789 A1 | 7/2015 | Tanaka |
| 2015/0198790 A1 | 7/2015 | Tanaka et al. |

* cited by examiner

IMAGING LENS

This application is a Continuation of U.S. patent application Ser. No. 14/573,305, filed on Dec. 17, 2014, which is based on and claims priority of Japanese patent application No. 2014-144452 filed on Jul. 14, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens which is built in image pickup devices mounted in increasingly compact and low-profile smartphones and mobile phones, PDAs (Personal Digital Assistants), game consoles, information terminals such as PCs, and home appliances with a camera function.

Description of the Related Art

In recent years, there has been a general tendency that many information terminals have a camera function. Also, home appliances with a camera have been introduced into the market. For example, a user who is away from home can see in real time what is going on at home, through the camera mounted in a home appliance by telecommunication between the home appliance and his/her smart phone. It is thought that products which enhance consumer convenience by adding a camera function to an information terminal or home appliance will be increasingly developed in the future. The camera mounted in such products is expected not only to provide high resolution to cope with an increase in the number of pixels but also to be compact and low-profile and offer high brightness and a wide field of view. In particular, the imaging lens to be built in a mobile terminal is strongly expected not only to be low-profile enough to be applicable to a low-profile product but also to deliver high imaging performance.

However, in order to provide a low-profile imaging lens with a wide field of view and high brightness as described above, the following problem has to be addressed: it is difficult to correct aberrations in the peripheral area of the image and ensure high imaging performance throughout the image.

Conventionally, for example, the imaging lens described in JP-A-2011-085733 (Patent Document 1) is known as a compact high-resolution imaging lens.

Patent Document 1 discloses an imaging lens which includes, in order from an object side, a first lens group including a first lens having a convex surface on the object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This configuration is intended to provide a compact imaging lens system which offers high resolution.

The imaging lens described in Patent Document 1 has a total track length of about 6.0 mm and the ratio of total track length to the diagonal length of the effective imaging plane of the image sensor (hereinafter referred to as the "total length to diagonal ratio") is about 0.9, offering a lens system which is relatively low-profile and corrects aberrations properly. However, its F-value is about 2.8, so its brightness is not sufficient. Furthermore, its field of view is about 65 degrees, which is insufficient to meet the demand for a wide field of view. Also, in order for this configuration to offer brightness with an F-value of 2.5 or less and a field of view of 70 degrees or more, the problem with difficulty in correction of aberrations in the peripheral area of the image must be addressed.

SUMMARY OF THE INVENTION

The present invention has been made in view of the above problem, and an object thereof is to provide a compact high-resolution imaging lens which meets the demand for low-profileness and offers brightness with an F-value of 2.5 or less and a wide field of view and corrects various aberrations properly.

Here, "low-profile" implies that the total length to diagonal ratio is much smaller than 1.0 and "wide field of view" implies that the field of view is 70 degrees or more. In determination of the total length to diagonal ratio, the diagonal length of the effective imaging plane of the image sensor is taken as equal to the diameter of an effective imaging circle whose radius is the vertical height from an optical axis to the point where a light ray incident on the imaging lens at a maximum field of view enters the image plane, namely the maximum image height.

In the present invention, in terms of lens surface shape, a convex surface or a concave surface means that the paraxial portion of the surface (portion near the optical axis) is convex or concave. A "pole-change point" on an aspheric surface means a point on an aspheric surface at which a tangential plane intersects the optical axis perpendicularly. The values of total track length and back focus are defined as distances on the optical axis as calculated with an optical element such as an IR cut filter or cover glass removed.

According to one aspect of the present invention, there is provided an imaging lens which forms an image of an object on a solid-state image sensor and provides brightness with an F-value of 2.5 or less, in which elements are arranged in the following order from an object side to an image side: an aperture stop; a first lens with positive refractive power having a convex surface on the object side; a second lens with negative refractive power as a biconcave lens having a concave surface on each of the object side and the image side; a third lens with positive or negative refractive power having a convex surface on the object side and having at least one aspheric surface; a fourth lens with positive refractive power as a meniscus double-sided aspheric lens having a convex surface on the image side; and a fifth lens with negative refractive power as a double-sided aspheric lens having a concave surface on the image side. The aspheric image-side surface of the fifth lens has a pole-change point off an optical axis and the imaging lens satisfies conditional expressions (1), (2) and (3) below:

$$TTL/2ih \leq 0.8 \quad (1)$$

$$1.60 < Nd3 < 1.70 \quad (2)$$

$$4.0 < |r9/r10| < 14.0 \quad (3)$$

where
TTL: total track length
ih: maximum image height
Nd3: refractive index of the third lens at d-ray
r9: curvature radius of the object-side surface of the fifth lens
r10: curvature radius of the image-side surface of the fifth lens.

In the imaging lens with the above configuration, the first lens has strong positive refractive power, thereby contributing to low-profileness. The biconcave second lens corrects spherical aberrations and chromatic aberrations which occur on the first lens. The third lens, having a convex surface on the object side, can correct field curvature properly. The third lens, which has the weakest positive or negative refractive power, corrects high-order spherical aberrations and coma aberrations by at least one aspheric surface thereof. As for the fourth lens, its positive refractive power contributes to ensuring low-profileness, and by its meniscus shape with a convex surface on the image side, it guides off-axial rays to the fifth lens with a small refraction angle and by its aspheric surfaces on the both sides, it corrects astigmatism and field curvature properly. In addition, since the fifth lens has negative refractive power, the telephoto capability is enhanced and low-profileness is achieved. Since the image-side surface of the fifth lens is an aspheric surface with a pole-change point, field curvature and distortion are corrected and the angle of a chief ray incident on the image sensor can be controlled appropriately.

Since the aperture stop is located on the object side of the first lens, the exit pupil is near the object and the telecentricity on the image side is increased. Therefore, shading phenomena in the peripheral area can be suppressed.

The conditional expression (1) defines an appropriate range for the total length to diagonal ratio. When the value is below the upper limit of the conditional expression (1), that is, the total track length is not more than 80% of the diagonal length of the effective imaging plane of the image sensor, the recent demand for low-profileness can be satisfied.

The conditional expression (2) defines an appropriate range for the refractive index of the third lens at d-ray. When material which satisfies the conditional expression (2) is used for the third lens, field curvature is corrected properly.

The conditional expression (3) defines an appropriate range for the ratio of the curvature radius of the object-side surface of the fifth lens to the curvature radius of its image-side surface, and indicates a condition to ensure low-profileness and correct chromatic aberrations properly. If the value is above the upper limit of the conditional expression (3), the negative refractive power of the fifth lens would be too weak to correct chromatic aberrations properly. On the other hand, if the value is below the lower limit of the conditional expression (3), the negative refractive power of the fifth lens would be too strong to ensure low-profileness.

Preferably, the imaging lens with the above configuration satisfies a conditional expression (4) below:

$$3.5 < |r2/r1| \quad (4)$$

where
r1: curvature radius of the object-side surface of the first lens
r2: curvature radius of the image-side surface of the first lens.

The conditional expression (4) defines an appropriate range for the ratio of the curvature radius of the object-side surface of the first lens to the curvature radius of its image-side surface, and indicates a condition to ensure low-profileness and suppress ghost phenomena. If the value is below the lower limit of the conditional expression (4), the refractive power of the object-side surface of the first lens would be weaker, which would be disadvantageous in ensuring low-profileness. Furthermore, if the value is below the lower limit, the angle of rays incident on the image-side surface would be larger, which would make it more likely to cause reflection on the image-side surface. Since such reflected light rays are again reflected toward the image side on the object-side surface, finally they might cause a ghost phenomenon upon arrival at the image plane.

Preferably, the imaging lens with the above configuration satisfies a conditional expression (5) below:

$$-1.5 < f2/f < -0.5 \quad (5)$$

where
f: focal length of the overall optical system of the imaging lens
f2: focal length of the second lens.

The conditional expression (5) defines an appropriate range for the ratio of the focal length of the second lens to the focal length of the overall optical system of the imaging lens, and indicates a condition to ensure low-profileness and correct chromatic aberrations. If the value is above the upper limit of the conditional expression (5), the negative refractive power of the second lens would be too strong to ensure low-profileness, though it would be effective in correcting chromatic aberrations. Furthermore, undesirably the manufacturing error sensitivity of the second lens would increase. On the other hand, if the value is below the lower limit of the conditional expression (5), the negative refractive power of the second lens would be too weak to correct chromatic aberrations, though it would be advantageous in ensuring low-profileness.

Preferably, the imaging lens with the above configuration satisfies conditional expressions (6) and (7) below:

$$45 < vd1 < 75 \quad (6)$$

$$20 < vd2 < 35 \quad (7)$$

where
vd1: Abbe number of the first lens at d-ray
vd2: Abbe number of the second lens at d-ray.

The conditional expression (6) defines an appropriate range for the Abbe number of the first lens at d-ray and the conditional expression (7) defines an appropriate range for the Abbe number of the second lens at d-ray. When the first lens is made of low-dispersion material and the second lens is made of high-dispersion material, chromatic aberrations can be corrected properly. In addition, these conditional expressions suggest that inexpensive plastic materials may be selected, so the cost of the imaging lens can be lowered by selection of such inexpensive materials.

Preferably, the imaging lens with the above configuration satisfies a conditional expression (8) below:

$$0.5 < f1/f4 < 1.8 \quad (8)$$

where
f1: focal length of the first lens
f4: focal length of the fourth lens.

The conditional expression (8) defines an appropriate range for the ratio of the focal length of the first lens to the focal length of the fourth lens, and indicates a condition to ensure an appropriate back focus and low-profileness and correct various aberrations. If the value is above the upper limit of the conditional expression (8), the positive refractive power of the first lens would be relatively weak and the positive refractive power of the fourth lens would be relatively strong, causing the principal point on the image side of the imaging lens to shift toward the image. In this case, the distance of the overall optical system in the optical axis direction would increase, making it difficult to ensure low-profileness, though an appropriate back focus would be ensured. On the other hand, if the value is below the lower limit of the conditional expression (8), the relation in refractive power between the first lens and the fourth lens would be reverse to the above relation. Specifically, the positive refractive power of the first lens would be relatively too strong to correct high-order spherical aberrations and coma aberrations which occur on the first lens. By balancing the relation in positive refractive power between the first lens and the fourth lens within the range defined by the conditional expression (8), spherical aberrations and coma aberrations can be suppressed while an appropriate back focus and low-profileness are ensured.

Preferably, the imaging lens with the above configuration satisfies a conditional expression (9) below:

$$-1.3 < r3/r4 < -0.7 \qquad (9)$$

where r3: curvature radius of the object-side surface of the second lens r4: curvature radius of the image-side surface of the second lens.

The conditional expression (9) defines an appropriate range for the ratio of the curvature radius of the object-side surface of the second lens and the curvature radius of its image-side surface, and indicates a condition to ensure low-profileness and suppress increase in the manufacturing error sensitivity of the second lens. If the value is above the upper limit of the conditional expression (9), the curvature radius of the object-side surface of the second lens would be relatively small and the negative refractive power of the second lens would be stronger. In this case, the manufacturing error sensitivity of the second lens would increase, which would be a factor that impedes stability in production. On the other hand, if the value is below the lower limit of the conditional expression (9), the curvature radius of the object-side surface of the second lens would be relatively large and the negative refractive power of the second lens would be weaker. In this case, it would be difficult to correct spherical aberrations and chromatic aberrations which occur on the first lens.

Preferably, the imaging lens with the above configuration satisfies a conditional expression (10) below:

$$1.5 < r7/r8 < 3.0 \qquad (10)$$

where r7: curvature radius of the object-side surface of the fourth lens r8: curvature radius of the image-side surface of the fourth lens.

The conditional expression (10) defines an appropriate range for the ratio of the curvature radius of the object-side surface of the fourth lens and the curvature radius of its image-side surface, and indicates a condition to ensure low-profileness and correct spherical aberrations. If the value is above the upper limit of the conditional expression (10), the fourth lens would be a meniscus lens whose refractive power is too strong to correct spherical aberrations. On the other hand, if the value is below the lower limit of the conditional expression (10), the fourth lens would be a meniscus lens whose refractive power is too weak to ensure low-profileness.

Preferably, the imaging lens with the above configuration satisfies conditional expressions (11) and (12) below:

$$45 < vd4 < 75 \qquad (11)$$

$$45 < vd5 < 75 \qquad (12)$$

where vd4: Abbe number of the fourth lens at d-ray vd5: Abbe number of the fifth lens at d-ray.

The conditional expression (11) defines an appropriate range for the Abbe number of the fourth lens at d-ray and the conditional expression (12) defines an appropriate range for the Abbe number of the fifth lens at d-ray. When low-dispersion material is used for the fourth lens and the fifth lens, chromatic aberrations can be suppressed. In addition, these conditional expressions suggest that inexpensive plastic materials may be selected, so the cost of the imaging lens can be lowered by selection of such inexpensive materials.

DETAILED DESCRIPTION OF THE PREFERRED EMBODIMENTS

Hereinafter, the preferred embodiment of the present invention will be described in detail referring to the accompanying drawings. FIGS. 1, 3, 5, 7, and 9 are schematic views showing the general configurations of the imaging lenses in Examples 1 to 5 according to this embodiment, respectively. Since all these examples have the same basic lens configuration, the general configuration of an imaging lens according to this embodiment is explained below referring to the schematic view of Example 1.

Figure 1:
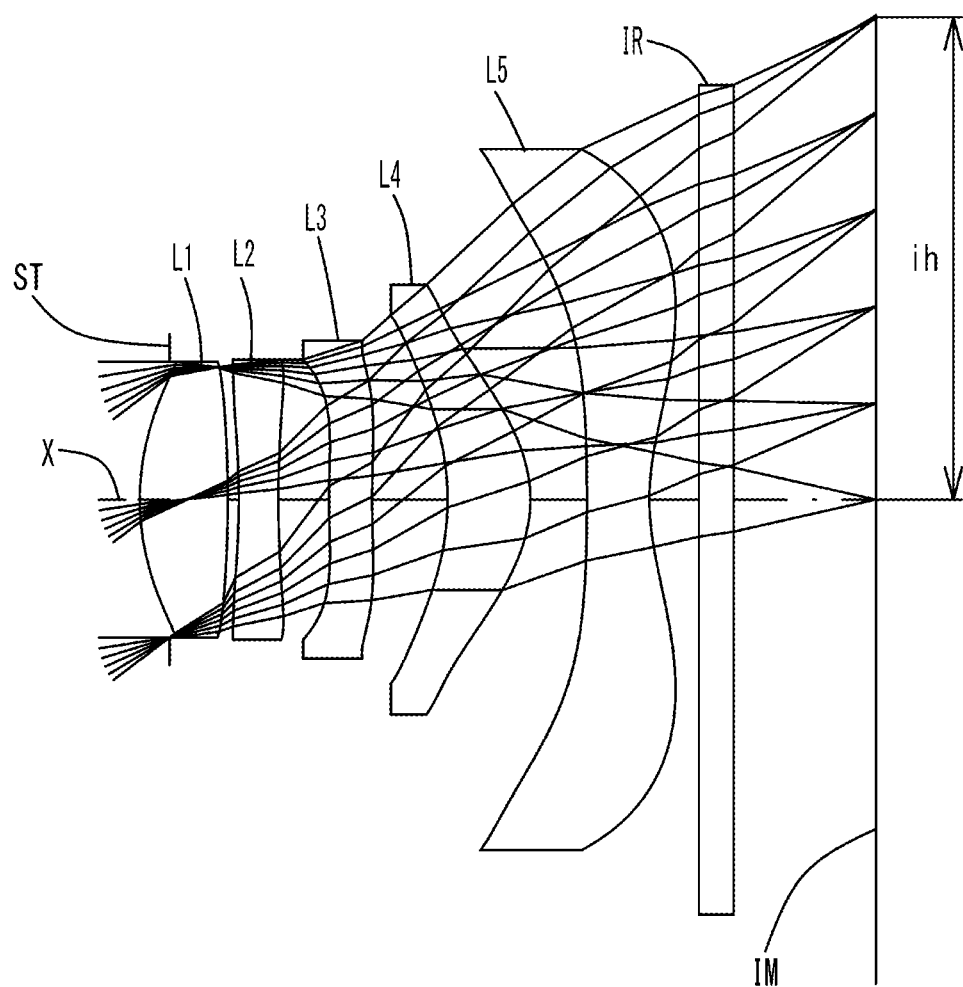
FIG. 1 is a schematic view showing the general configuration of an imaging lens in Example 1.

As shown in FIG. 1, the imaging lens according to this embodiment is an imaging lens which forms an image of an object on a solid-state image sensor and provides brightness with an F-value of 2.5 or less. It includes, in order from an object side to an image side, an aperture stop ST, a first lens L1 with positive refractive power having a convex surface on the object side, a second lens L2 with negative refractive power as a biconcave lens having a concave surface on each of the object side and image side, a third lens L3 with positive or negative refractive power having a convex surface on the object side and having at least one aspheric surface, a fourth lens L4 with positive refractive power as a meniscus double-sided aspheric lens having a convex surface on the image side, and a fifth lens L5 with negative refractive power as a double-sided aspheric lens having a concave surface on the image side. The aspheric image-side surface of the fifth lens L5 has a pole-change point off an optical axis X. A filter IR such as an infrared cut filter is located between the fifth lens L5 and an image plane IM. The filter IR is omissible.

The first lens L1 has a biconvex shape and has strong positive refractive power to make the imaging lens low-profile.

The second lens L2 has a biconcave shape and corrects spherical aberrations and chromatic aberrations which occur on the first lens L1.

The third lens L3 has a meniscus shape with a convex surface on the object side and has the weakest positive or negative refractive power among the constituent lenses of the imaging lens. The convex surface on the object side corrects field curvature properly and the aspheric surfaces on the both sides correct high-order spherical aberrations and coma aberrations. The third lens L3 has aspheric surfaces with peripheral portions curved toward the object side on its both sides so that the angles of light rays are controlled appropriately and aberrations in the peripheral area of the image are corrected properly.

The fourth lens L4 has positive refractive power to ensure low-profileness and due to its meniscus shape with a convex surface on the image side, it guides off-axial rays to the fifth lens L5 with a small refraction angle. Also, the aspheric surfaces on the both sides correct astigmatism and field curvature properly.

The fifth lens L5 has a biconcave shape and is located nearest to the image plane so that its negative refractive power enhances the telephoto capability and contributes to low-profileness. In addition, the image-side surface of the fifth lens L5 has an aspheric shape with a pole-change point, corrects field curvature and distortion, and controls the angle of a chief ray incident on the image sensor.

The aperture stop ST is located on the object side of the first lens L1. Therefore, since the exit pupil is nearer to the object, the telecentricity on the image side is enhanced so that shading phenomena in the peripheral area can be suppressed.

In the imaging lens according to this embodiment, all the constituent lenses are made of plastic material, so the manufacturing process is made easier and the imaging lens can be mass-produced at low cost. All the lens surfaces have appropriate aspheric shapes so that various aberrations can be corrected more properly.

When the imaging lens according to this embodiment satisfies conditional expressions (1) to (12) below, it brings about advantageous effects:

$$TTL/2ih \leq 0.8 \quad (1)$$

$$1.60 < Nd3 < 1.70 \quad (2)$$

$$4.0 < |r9/r10| < 14.0 \quad (3)$$

$$3.5 < |r2/r1| \quad (4)$$

$$-1.5 < f2/f < -0.5 \quad (5)$$

$$45 < vd1 < 75 \quad (6)$$

$$20 < vd2 < 35 \quad (7)$$

$$0.5 < f1/f4 < 1.8 \quad (8)$$

$$-1.3 < r3/r4 < -0.7 \quad (9)$$

$$1.5 < r7/r8 < 3.0 \quad (10)$$

$$45 < vd4 < 75 \quad (11)$$

$$45 < vd5 < 75 \quad (12)$$

where
TTL: total track length
ih: maximum image height
Nd3: refractive index of the third lens L3 at d-ray
r1: curvature radius of the object-side surface of the first lens L1
r2: curvature radius of the image-side surface of the first lens L1
r3: curvature radius of the object-side surface of the second lens L2
r4: curvature radius of the image-side surface of the second lens L2
r7: curvature radius of the object-side surface of the fourth lens L4
r8: curvature radius of the image-side surface of the fourth lens L4
r9: curvature radius of the object-side surface of the fifth lens L5
r10: curvature radius of the image-side surface of the fifth lens L5
f: focal length of the overall optical system of the imaging lens
f1: focal length of the first lens L1
f2: focal length of the second lens L2
f4: focal length of the fourth lens L4
vd1: Abbe number of the first lens L1 at d-ray
vd2: Abbe number of the second lens L2 at d-ray
vd4: Abbe number of the fourth lens L4 at d-ray
vd5: Abbe number of the fifth lens L5 at d-ray.

When the value is below the upper limit of the conditional expression (1), that is, the total track length is not more than 80% of the diagonal length of the effective imaging plane of the image sensor, the recent demand for low-profileness can be satisfied.

When material which satisfies the conditional expression (2) is used for the third lens L3, field curvature is corrected properly.

When the conditional expression (3) is satisfied, the relation between the curvature radius of the object-side surface of the fifth lens L5 and the curvature radius of its image-side surface is optimized to ensure low-profileness and correct chromatic aberrations properly.

When the conditional expression (4) is satisfied, the relation between the curvature radius of the object-side surface of the first lens L1 and the curvature radius of its image-side surface is optimized to ensure low-profileness and suppress ghost phenomena.

When the conditional expression (5) is satisfied, the relation between the focal length of the second lens L2 and the focal length of the overall optical system of the imaging lens is optimized to ensure low-profileness and correct chromatic aberrations.

When the conditional expressions (6) and (7) are satisfied, the first lens L1 is made of low-dispersion material and the second lens L2 is made of high-dispersion material, so chromatic aberrations can be corrected properly. Since materials of the lenses which satisfy these conditional expressions include inexpensive plastic materials, the cost of the imaging lens can be lowered by selection of such inexpensive materials.

When the conditional expression (8) is satisfied, the relation between the focal length of the first lens L1 and the focal length of the fourth lens L4 is optimized to ensure an appropriate back focus and low-profileness and correct various aberrations properly.

When the conditional expression (9) is satisfied, the relation between the curvature radius of the object-side surface of the second lens L2 and the curvature radius of its image-side surface is optimized to ensure low-profileness and suppress increase in the manufacturing error sensitivity of the second lens L2.

When the conditional expression (10) is satisfied, the relation between the curvature radius of the object-side surface of the fourth lens L4 and the curvature radius of its image-side surface is optimized to ensure low-profileness and correct spherical aberrations.

When the conditional expressions (11) and (12) are satisfied, the fourth lens L4 and fifth lens L5 are made of low-dispersion material, so chromatic aberrations are suppressed. Since materials of the lenses which satisfy these conditional expressions include inexpensive plastic materials, the cost of the imaging lens can be lowered by selection of such inexpensive materials.

When the imaging lens according to this embodiment satisfies conditional expressions (1a) to (12a) below, it brings about more advantageous effects:

$TTL/2ih \leq 0.78$ (1a)

$1.60 < Nd3 < 1.66$ (2a)

$4.5 < |r9/r10| < 13.0$ (3a)

$4.0 < |r2/r1|$ (4a)

$-1.3 < f2/f < -0.8$ (5a)

$50 < vd1 < 60$ (6a)

$20 < vd2 < 30$ (7a)

$0.65 < f1/f4 < 1.4$ (8a)

$-1.25 < r3/r4 < -0.75$ (9a)

$1.8 < r7/r8 < 3.0$ (10a)

$50 < vd4 < 60$ (11a)

$50 < vd5 < 60.$ (12a)

The signs in the above conditional expressions have the same meanings as those in the conditional expressions (1) to (12) explained above.

When the imaging lens according to this embodiment satisfies conditional expressions (1b) to (12b) below, it brings about particularly advantageous effects:

$TTL/2ih \leq 0.75$ (1b)

$1.62 < Nd3 < 1.66$ (2b)

$5.26 \leq |r9/r10| \leq 11.71$ (3b)

$4.47 \leq |r2/r1|$ (4b)

$-1.12 \leq f2/f \leq -1.05$ (5b)

$52 < vd1 < 58$ (6b)

$20 < vd2 < 25$ (7b)

$0.79 \leq f1/f4 \leq 1.06$ (8b)

$-1.21 \leq r3/r4 \leq -0.84$ (9b)

$1.98 \leq r7/r8 \leq 2.75$ (10b)

$52 < vd4 < 58$ (11b)

$52 < vd5 < 58.$ (12b)

The signs in the above conditional expressions have the same meanings as those in the conditional expressions (1) to (12) explained above.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, ω denotes a half field of view, TTL denotes total track length, and ih denotes a maximum image height. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown in Table 1 below.

TABLE 1

| Example 1 in mm |
| --- |
| f = 3.782 |
| Fno = 2.26 |
| ω(°) = 37.2 |
| TTL = 4.4 |
| ih = 2.93 |

| Surface Data | | | | |
| --- | --- | --- | --- | --- |
| Surface No. i | Curvature Radius r | Surface Distance d | Refractive Index Nd | Abbe Number vd |
| (Object Surface) | Infinity | Infinity | | |
| 1 (Stop) | Infinity | −0.180 | | |
| 2* | 1.525 | 0.532 | 1.544 | 55.57 |

TABLE 1-continued

| | | | | |
|---|---|---|---|---|
| 3* | −8.571 | 0.067 | | |
| 4* | −4.932 | 0.239 | 1.639 | 23.25 |
| 5* | 5.899 | 0.307 | | |
| 6* | 6.157 | 0.261 | 1.639 | 23.25 |
| 7* | 6.731 | 0.456 | | |
| 8* | −1.621 | 0.502 | 1.535 | 55.66 |
| 9* | −0.805 | 0.343 | | |
| 10* | −11.806 | 0.377 | 1.535 | 55.66 |
| 11* | 1.378 | 0.300 | | |
| 12 | Infinity | 0.210 | 1.517 | 64.17 |
| 13 | Infinity | 0.847 | | |
| Image Plane | Infinity | | | |

Constituent Lens Data

| Lens | Start Surface | Focal Length |
|---|---|---|
| 1 | 2 | 2.426 |
| 2 | 4 | −4.167 |
| 3 | 6 | 96.086 |
| 4 | 8 | 2.465 |
| 5 | 10 | −2.284 |

Aspheric Surface Data

| | 2nd Surface | 3rd Surface | 4th Surface | 5th Surface | 6th Surface |
|---|---|---|---|---|---|
| k | 1.968E−01 | 0.000E+00 | 0.000E+00 | −8.601E+00 | 0.000E+00 |
| A4 | −3.519E−02 | −9.821E−02 | −7.731E−02 | −1.138E−01 | −3.901E−01 |
| A6 | 6.053E−02 | 5.790E−01 | 9.148E−01 | 4.972E−01 | 1.254E−01 |
| A8 | −2.964E−01 | −1.880E+00 | −2.703E+00 | −1.389E+00 | −7.860E−01 |
| A10 | 4.222E−01 | 3.545E+00 | 4.982E+00 | 2.368E+00 | 1.428E+00 |
| A12 | −3.530E−01 | −3.839E+00 | −5.225E+00 | −2.548E+00 | −1.258E+00 |
| A14 | 5.217E−02 | 1.659E+00 | 2.233E+00 | 1.019E+00 | 4.887E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −2.382E+00 | 0.000E+00 | −1.001E+01 |
| A4 | −2.385E−01 | −1.686E−02 | −1.055E−01 | −2.935E−02 | −8.198E−02 |
| A6 | 5.487E−02 | 1.942E−01 | 8.526E−02 | −1.856E−02 | 2.880E−02 |
| A8 | −1.498E−01 | −9.925E−02 | 8.221E−03 | 1.086E−02 | −1.036E−02 |
| A10 | 1.810E−01 | −1.310E−01 | 1.730E−02 | −2.562E−03 | 2.194E−03 |
| A12 | 1.414E−02 | 2.003E−01 | −2.461E−02 | 3.970E−04 | −2.529E−04 |
| A14 | 1.849E−02 | −7.832E−02 | 5.025E−03 | −3.176E−05 | 9.651E−06 |
| A16 | 0.000E+00 | 0.000E+00 | 0.000E+00 | 0.000E+00 | 0.000E+00 |

As shown in Table 6, the imaging lens in Example 1 satisfies all the conditional expressions (1) to (12).

Figure 2:
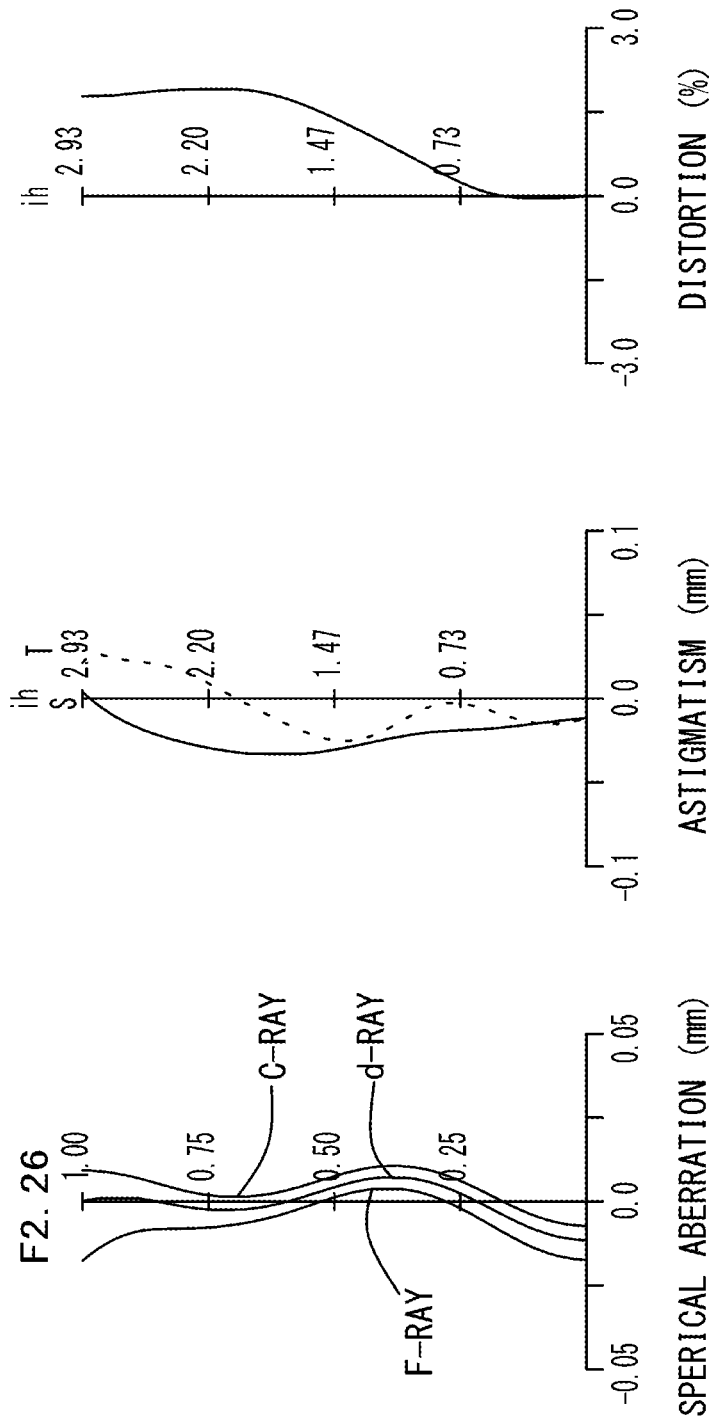
FIG. 2 shows spherical aberration, astigmatism, and distortion of the imaging lens in Example 1.
Figure 3:
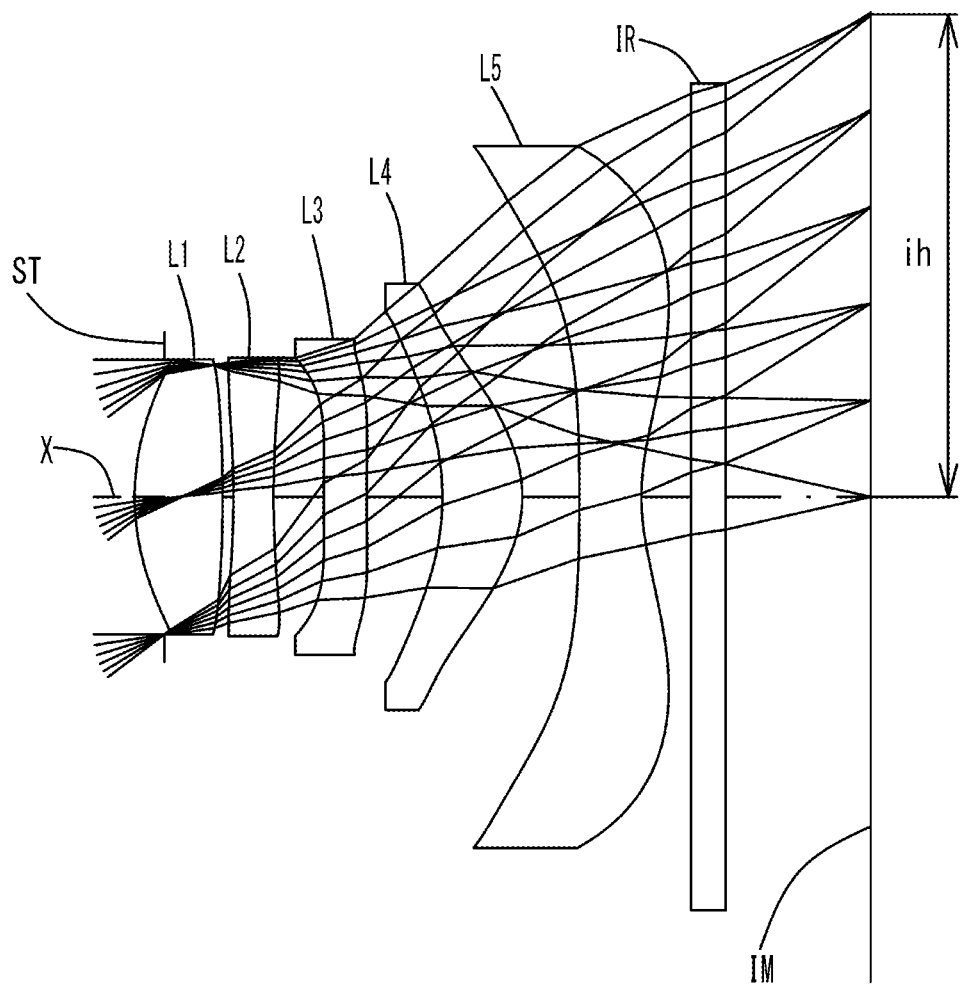
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, and 10). As shown in FIG. 2, each aberration is corrected properly.

In Example 1, the total track length is 4.4 mm and the total length to diagonal ratio is 0.74, suggesting that the imaging lens is low-profile. The imaging lens also offers brightness with an F-value of 2.26 and a wide field of view of about 74 degrees.

EXAMPLE 2

The basic lens data of Example 2 is shown in Table 2 below.

TABLE 2

Example 2 in mm f = 3.774
Fno = 2.27
ω(°) = 37.3
TTL = 4.4
ih = 2.93

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.180 | | |

TABLE 2-continued

| Surface | r | d | Nd | vd |
|---|---|---|---|---|
| 2* | 1.517 | 0.532 | 1.544 | 55.57 |
| 3* | −9.324 | 0.066 | | |
| 4* | −5.469 | 0.243 | 1.639 | 23.25 |
| 5* | 5.471 | 0.303 | | |
| 6* | 8.463 | 0.260 | 1.639 | 23.25 |
| 7* | 8.684 | 0.458 | | |
| 8* | −1.598 | 0.484 | 1.535 | 55.66 |
| 9* | −0.795 | 0.345 | | |
| 10* | −15.718 | 0.376 | 1.535 | 55.66 |
| 11* | 1.343 | 0.300 | | |
| 12 | Infinity | 0.210 | 1.517 | 64.17 |
| 13 | Infinity | 0.860 | | |
| Image Plane | Infinity | | | |

Constituent Lens Data

| Lens | Start Surface | Focal Length |
|---|---|---|
| 1 | 2 | 2.441 |
| 2 | 4 | −4.243 |
| 3 | 6 | 356.035 |
| 4 | 8 | 2.443 |
| 5 | 10 | −2.295 |

Aspheric Surface Data

| | 2nd Surface | 3rd Surface | 4th Surface | 5th Surface | 6th Surface |
|---|---|---|---|---|---|
| k | 1.978E−01 | 0.000E+00 | 0.000E+00 | −1.638E+00 | 0.000E+00 |
| A4 | −3.534E−02 | −1.021E−01 | −7.955E−02 | −1.088E−01 | −3.914E−01 |
| A6 | 6.089E−02 | 5.811E−01 | 9.173E−01 | 4.886E−01 | 1.264E−01 |
| A8 | −2.966E−01 | −1.874E+00 | −2.702E+00 | −1.394E+00 | −8.192E−01 |
| A10 | 4.244E−01 | 3.535E+00 | 4.988E+00 | 2.401E+00 | 1.424E+00 |
| A12 | −3.550E−01 | −3.847E+00 | −5.214E+00 | −2.561E+00 | −1.170E+00 |
| A14 | 4.786E−02 | 1.667E+00 | 2.210E+00 | 9.662E−01 | 4.154E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −2.366E+00 | 0.000E+00 | −9.659E+00 |
| A4 | −2.374E−01 | −1.328E−02 | −1.110E−01 | −3.108E−02 | −8.148E−02 |
| A6 | 5.316E−02 | 1.946E−01 | 8.742E−02 | −1.837E−02 | 2.881E−02 |
| A8 | −1.494E−01 | −9.674E−02 | 1.052E−02 | 1.100E−02 | −1.037E−02 |
| A10 | 1.793E−01 | −1.301E−01 | 1.796E−02 | −2.594E−03 | 2.200E−03 |
| A12 | 1.210E−02 | 1.995E−01 | −2.484E−02 | 3.787E−04 | −2.538E−04 |
| A14 | 3.133E−02 | −7.804E−02 | 4.556E−03 | −2.828E−05 | 9.825E−06 |
| A16 | 0.000E+00 | 0.000E+00 | 0.000E+00 | 0.000E+00 | 0.000E+00 |

As shown in Table 6, the imaging lens in Example 2 satisfies all the conditional expressions (1) to (12).

Figure 4:
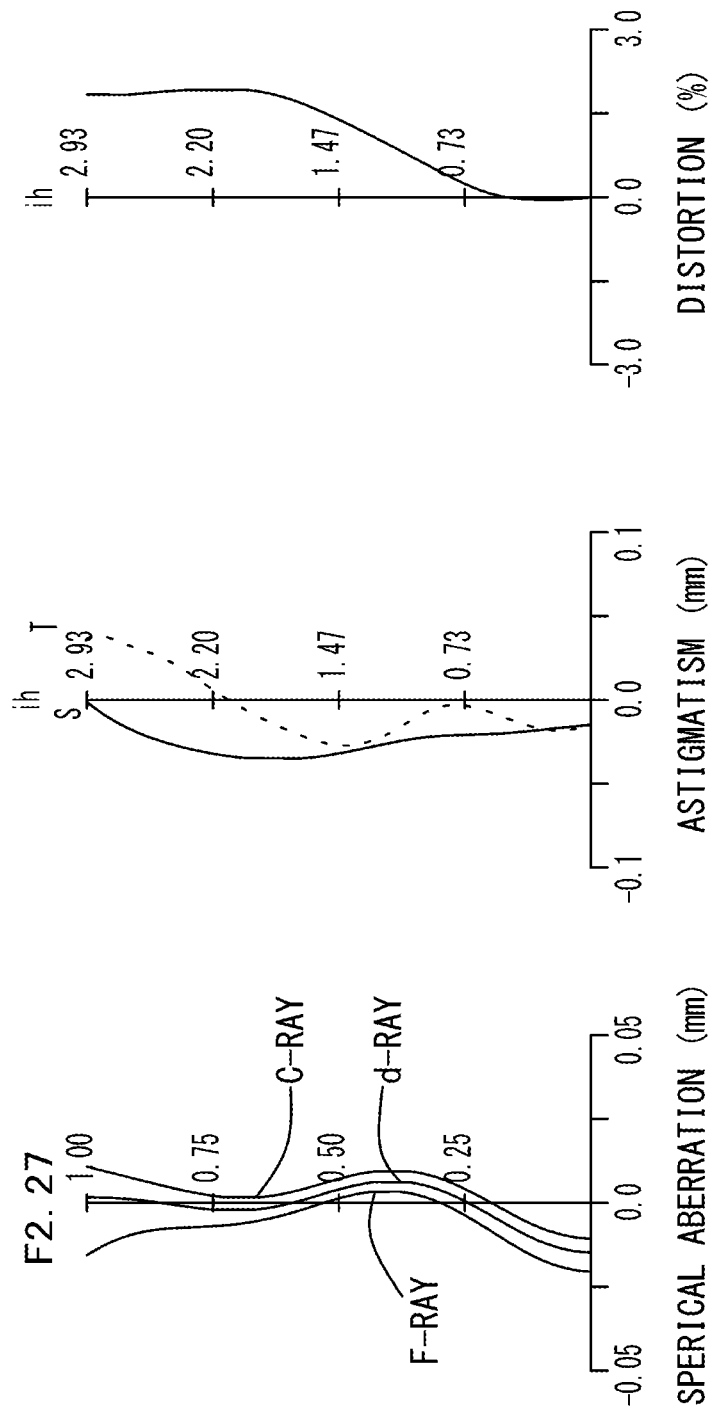
FIG. 4 shows spherical aberration, astigmatism, and distortion of the imaging lens in Example 2.
Figure 5:
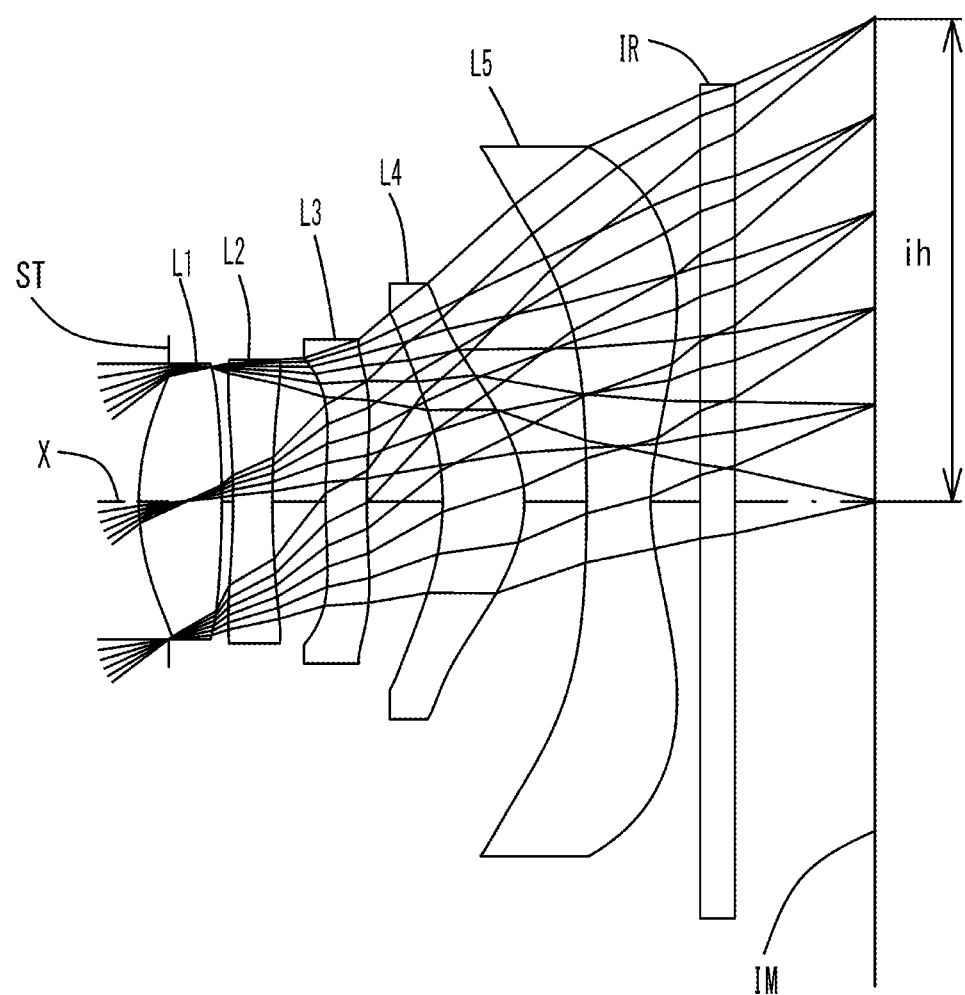
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

In Example 2, the total track length is 4.4 mm and the total length to diagonal ratio is 0.74, suggesting that the imaging lens is low-profile. The imaging lens also offers brightness with an F-value of 2.27 and a wide field of view of about 74 degrees.

EXAMPLE 3

The basic lens data of Example 3 is shown in Table 3 below.

TABLE 3

Example 3 in mm f = 3.785
Fno = 2.27
ω(°) = 37.2
TTL = 4.4
ih = 2.93

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.180 | | |
| 2* | 1.546 | 0.500 | 1.544 | 55.57 |
| 3* | −8.815 | 0.069 | | |

TABLE 3-continued

| Surface | Radius | Distance | Nd | vd |
|---|---|---|---|---|
| 4* | −5.036 | 0.238 | 1.639 | 23.25 |
| 5* | 5.498 | 0.322 | | |
| 6* | 3.820 | 0.250 | 1.639 | 23.25 |
| 7* | 4.272 | 0.459 | | |
| 8* | −1.650 | 0.494 | 1.535 | 55.66 |
| 9* | −0.833 | 0.377 | | |
| 10* | −11.572 | 0.388 | 1.535 | 55.66 |
| 11* | 1.463 | 0.300 | | |
| 12 | Infinity | 0.210 | 1.517 | 64.17 |
| 13 | Infinity | 0.832 | | |
| Image Plane | Infinity | | | |

Constituent Lens Data

| Lens | Start Surface | Focal Length |
|---|---|---|
| 1 | 2 | 2.460 |
| 2 | 4 | −4.077 |
| 3 | 6 | 46.538 |
| 4 | 8 | 2.598 |
| 5 | 10 | −2.403 |

Aspheric Surface Data

| | 2nd Surface | 3rd Surface | 4th Surface | 5th Surface | 6th Surface |
|---|---|---|---|---|---|
| k | 1.097E−01 | 0.000E+00 | 0.000E+00 | 6.865E+00 | 0.000E+00 |
| A4 | −3.978E−02 | −1.140E−01 | −6.813E−02 | −1.058E−01 | −3.783E−01 |
| A6 | 5.500E−02 | 5.690E−01 | 9.081E−01 | 5.300E−01 | 1.508E+00 |
| A8 | −3.079E−01 | −1.882E+00 | −2.700E+00 | −1.431E+00 | −8.083E−01 |
| A10 | 4.082E−01 | 3.563E+00 | 5.028E+00 | 2.432E+00 | 1.409E+00 |
| A12 | −3.530E−01 | −3.839E+00 | −5.225E+00 | −2.548E+00 | −1.258E+00 |
| A14 | 5.217E−02 | 1.659E+00 | 2.233E+00 | 1.019E+00 | 4.887E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −2.361E+00 | 0.000E+00 | −9.961E+00 |
| A4 | −2.394E−01 | −4.850E−03 | −9.381E−02 | −2.326E−02 | −7.818E−02 |
| A6 | 3.933E−02 | 1.953E−01 | 8.733E−02 | −1.761E−02 | 2.868E−02 |
| A8 | −1.532E−01 | −1.043E−01 | 7.019E−03 | 1.005E−02 | −1.038E−02 |
| A10 | 1.601E−01 | −1.341E−01 | 1.961E−02 | −2.561E−03 | 2.205E−03 |
| A12 | 1.417E−02 | 2.079E−01 | −2.631E−02 | 4.040E−04 | −2.542E−04 |
| A14 | 1.849E−02 | −7.832E−02 | 5.495E−03 | −2.949E−05 | 1.007E−05 |
| A16 | 0.000E+00 | 0.000E+00 | 0.000E+00 | 0.000E+00 | 0.000E+00 |

As shown in Table 6, the imaging lens in Example 3 satisfies all the conditional expressions (1) to (12).

Figure 6:
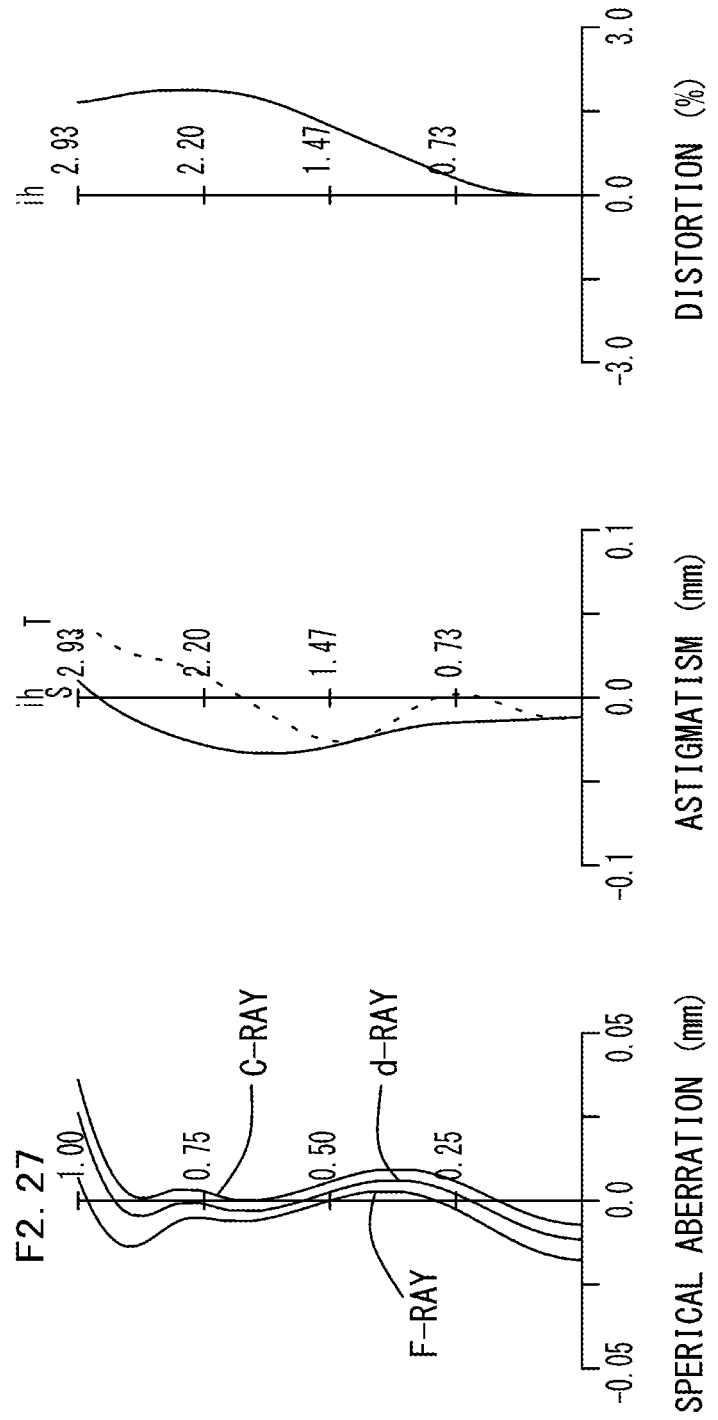
FIG. 6 shows spherical aberration, astigmatism, and distortion of the imaging lens in Example 3.
Figure 7:
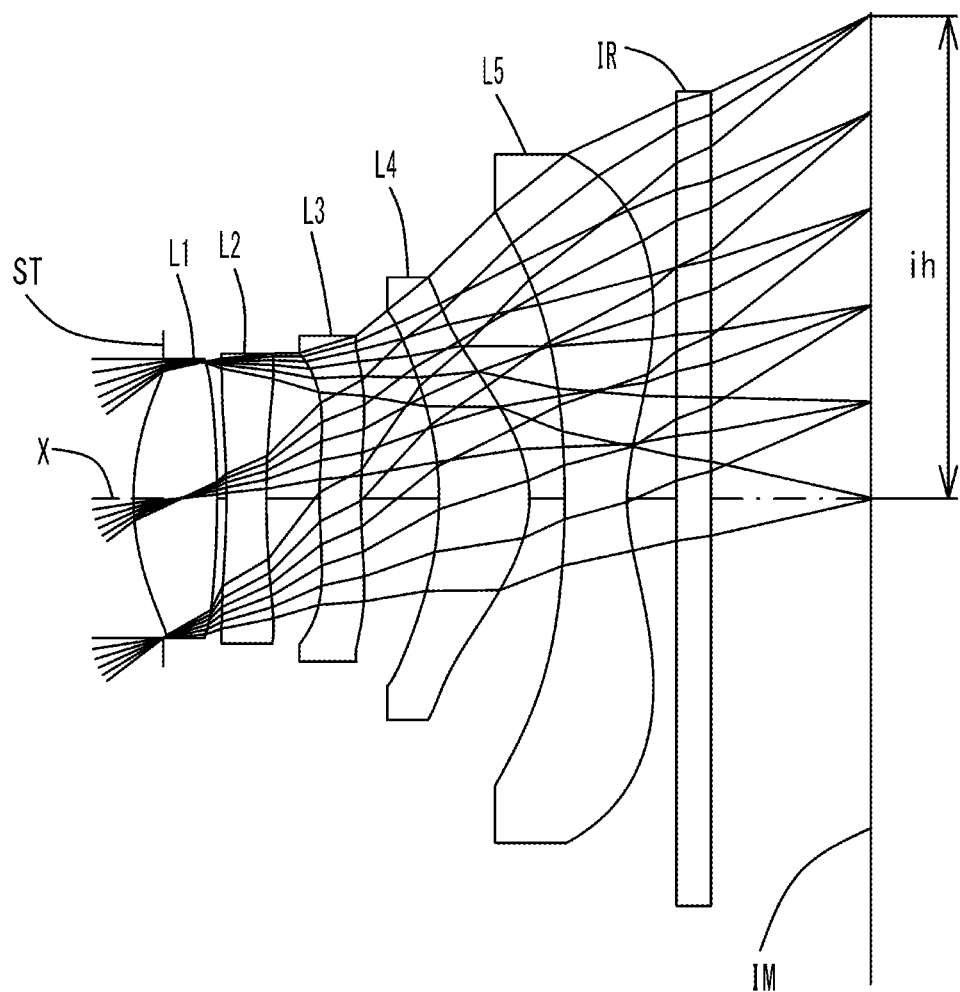
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In Example 3, the total track length is 4.4 mm and the total length to diagonal ratio is 0.74, suggesting that the imaging lens is low-profile. The imaging lens also offers brightness with an F-value of 2.27 and a wide field of view of about 74 degrees.

EXAMPLE 4

The basic lens data of Example 4 is shown in Table 4 below.

TABLE 4

Example 4 in mm f = 3.791
Fno = 2.24
ω(°) = 37.2
TTL = 4.4
ih = 2.93

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.180 | | |
| 2* | 1.569 | 0.505 | 1.544 | 55.57 |
| 3* | −7.068 | 0.058 | | |
| 4* | −5.386 | 0.241 | 1.639 | 23.25 |
| 5* | 4.948 | 0.323 | | |

TABLE 4-continued

| | | | | |
|---|---|---|---|---|
| 6* | 3.620 | 0.250 | 1.639 | 23.25 |
| 7* | 3.659 | 0.472 | | |
| 8* | −2.046 | 0.548 | 1.535 | 55.66 |
| 9* | −0.744 | 0.212 | | |
| 10* | −6.111 | 0.378 | 1.535 | 55.66 |
| 11* | 1.162 | 0.300 | | |
| 12 | Infinity | 0.210 | 1.517 | 64.17 |
| 13 | Infinity | 0.951 | | |
| Image Plane | Infinity | | | |

Constituent Lens Data

| Lens | Start Surface | Focal Length |
|---|---|---|
| 1 | 2 | 2.411 |
| 2 | 4 | −3.999 |
| 3 | 6 | 151.867 |
| 4 | 8 | 1.907 |
| 5 | 10 | −1.793 |

Aspheric Surface Data

| | 2nd Surface | 3rd Surface | 4th Surface | 5th Surface | 6th Surface |
|---|---|---|---|---|---|
| k | 9.590E−02 | 0.000E+00 | 0.000E+00 | −7.413E+00 | 0.000E+00 |
| A4 | −4.330E−02 | −9.415E−02 | −7.391E−02 | −1.179E−01 | −3.720E−01 |
| A6 | 6.462E−02 | 5.670E−01 | 9.156E−01 | 5.582E−01 | 1.398E−01 |
| A8 | −3.140E−01 | −1.889E+00 | −2.721E+00 | −1.502E+00 | −7.170E−01 |
| A10 | 4.192E−01 | 3.555E+00 | 5.009E+00 | 2.479E+00 | 1.349E+00 |
| A12 | −3.530E−01 | −3.839E+00 | −5.225E+00 | −2.548E+00 | −1.258E+00 |
| A14 | 5.217E−02 | 1.659E+00 | 2.233E+00 | 1.019E+00 | 4.887E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −2.766E+00 | 0.000E+00 | −1.116E+01 |
| A4 | −2.483E−01 | −5.176E−02 | −1.136E−01 | −1.116E−02 | −8.978E−02 |
| A6 | 5.052E−02 | 1.977E−01 | 9.118E−02 | −1.806E−02 | 3.530E−02 |
| A8 | −1.342E−01 | −1.098E−01 | 9.735E−03 | 1.059E−02 | −1.199E−02 |
| A10 | 1.358E−01 | −1.428E−01 | 1.726E−02 | −2.737E−03 | 2.201E−03 |
| A12 | 1.417E−02 | 2.116E−01 | −2.703E−02 | 3.747E−04 | −1.914E−04 |
| A14 | 1.849E−02 | −7.832E−02 | 6.288E−03 | −1.996E−05 | 1.349E−06 |
| A16 | 0.000E+00 | 0.000E+00 | 0.000E+00 | 0.000E+00 | 0.000E+00 |

As shown in Table 6, the imaging lens in Example 4 satisfies all the conditional expressions (1) to (12).

Figure 8:
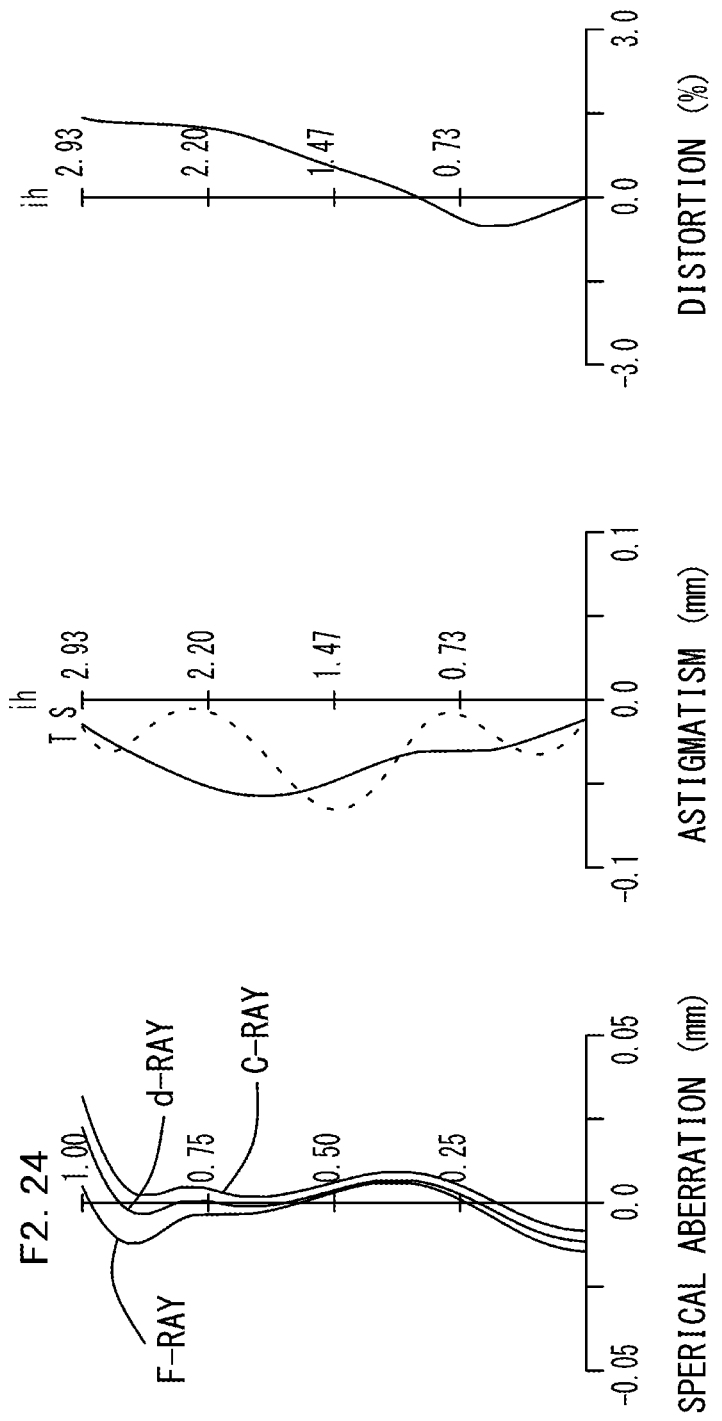
FIG. 8 shows spherical aberration, astigmatism, and distortion of the imaging lens in Example 4.
Figure 9:
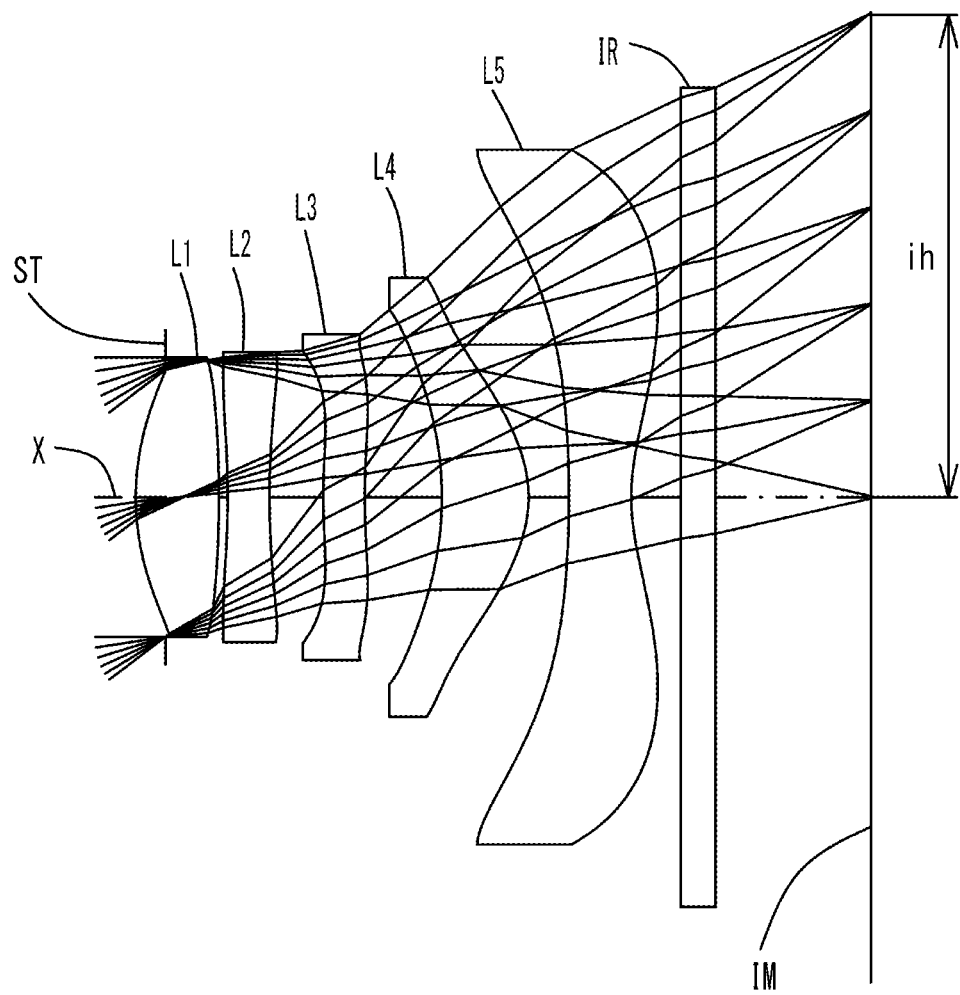
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In Example 4, the total track length is 4.4 mm and the total length to diagonal ratio is 0.75, suggesting that the imaging lens is low-profile. The imaging lens also offers brightness with an F-value of 2.24 and a wide field of view of about 74 degrees.

EXAMPLE 5

The basic lens data of Example 5 is shown in Table 5 below.

TABLE 5

Example 5 in mm f = 3.785
Fno = 2.24
ω(°) = 37.3
TTL = 4.4
ih = 2.93

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.180 | | |
| 2* | 1.575 | 0.503 | 1.544 | 55.57 |
| 3* | −7.040 | 0.052 | | |
| 4* | −5.791 | 0.254 | 1.639 | 23.25 |
| 5* | 4.800 | 0.326 | | |
| 6* | 3.916 | 0.250 | 1.639 | 23.25 |
| 7* | 3.735 | 0.467 | | |

TABLE 5-continued

| | | | | |
|---|---|---|---|---|
| 8* | −2.103 | 0.525 | 1.535 | 55.66 |
| 9* | −0.780 | 0.244 | | |
| 10* | −6.895 | 0.377 | 1.535 | 55.66 |
| 11* | 1.249 | 0.300 | | |
| 12 | Infinity | 0.210 | 1.517 | 64.17 |
| 13 | Infinity | 0.938 | | |
| Image Plane | Infinity | | | |

Constituent Lens Data

| Lens | Start Surface | Focal Length |
|---|---|---|
| 1 | 2 | 2.417 |
| 2 | 4 | −4.069 |
| 3 | 6 | −273.296 |
| 4 | 8 | 2.038 |
| 5 | 10 | −1.946 |

Aspheric Surface Data

| | 2nd Surface | 3rd Surface | 4th Surface | 5th Surface | 6th Surface |
|---|---|---|---|---|---|
| k | 1.114E−01 | 0.000E+00 | 0.000E+00 | −1.183E+01 | 0.000E+00 |
| A4 | −4.362E−02 | −8.721E−02 | −7.797E−02 | −1.207E−01 | −3.712E−01 |
| A6 | 6.795E−02 | 5.643E−01 | 9.163E−01 | 5.684E−01 | 1.355E−01 |
| A8 | −3.181E−01 | −1.894E+00 | −2.731E+00 | −1.530E+00 | −7.078E−01 |
| A10 | 4.234E−01 | 3.560E+00 | 5.022E+00 | 2.517E+00 | 1.377E+00 |
| A12 | −3.530E−01 | −3.839E+00 | −5.225E+00 | −2.548E+00 | −1.258E+00 |
| A14 | 5.217E−02 | 1.659E+00 | 2.233E+00 | 1.019E+00 | 4.887E−01 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −2.718E+00 | 0.000E+00 | −1.060E+01 |
| A4 | −2.566E−01 | −6.304E−02 | −1.155E−01 | −1.596E−02 | −8.879E−02 |
| A6 | 5.763E−02 | 2.009E−01 | 9.473E−02 | −1.659E−02 | 3.504E−02 |
| A8 | −1.211E−01 | −1.089E−01 | 8.519E−03 | 1.091E−02 | −1.211E−02 |
| A10 | 1.276E−01 | −1.454E−01 | 1.595E−02 | −2.894E−03 | 2.340E−03 |
| A12 | 1.418E−02 | 2.112E−01 | −2.713E−02 | 3.632E−04 | −2.281E−04 |
| A14 | 1.850E−02 | −7.833E−02 | 6.455E−03 | −1.432E−05 | 5.060E−06 |
| A16 | 0.000E+00 | 0.000E+00 | 0.000E+00 | 0.000E+00 | 0.000E+00 |

As shown in Table 6, the imaging lens in Example 5 satisfies all the conditional expressions (1) to (12).

Figure 10:
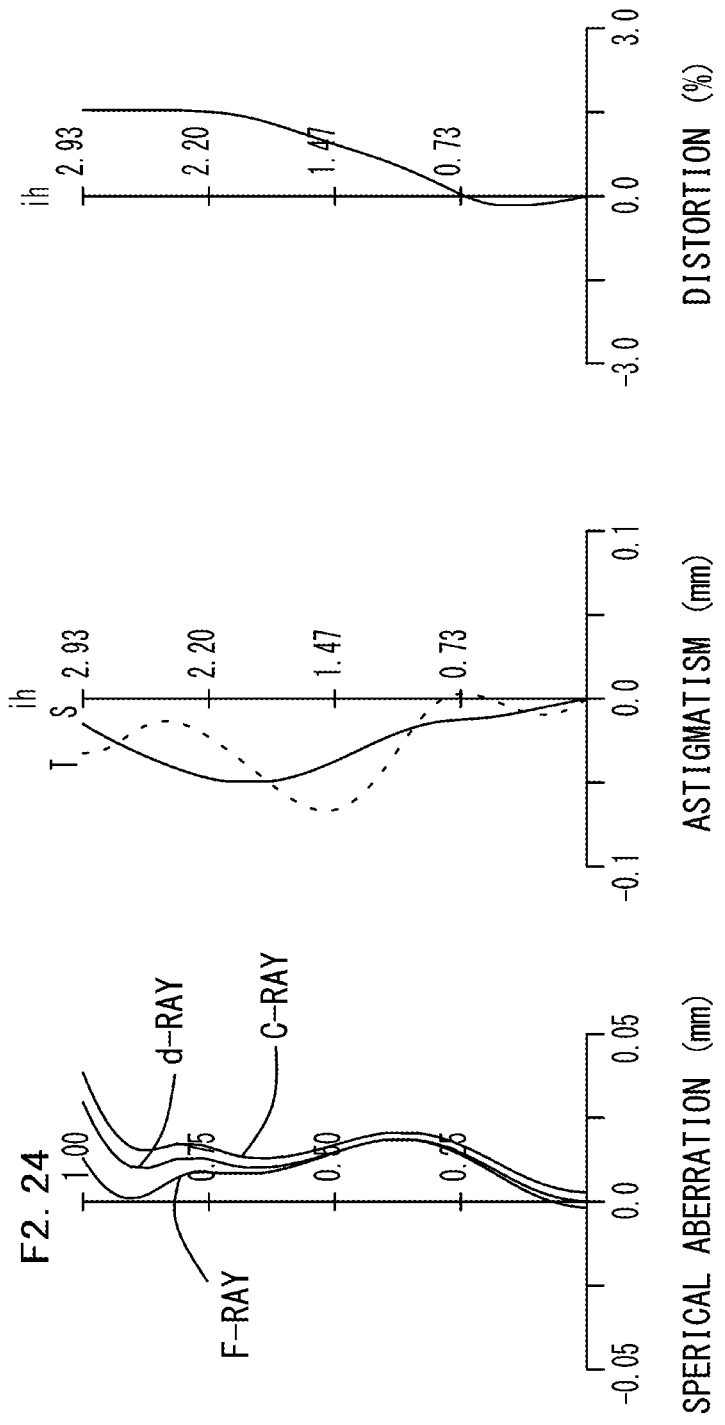
FIG. 10 shows spherical aberration, astigmatism, and distortion of the imaging lens in Example 5.

FIG. 10 shows spherical aberration (mm), astigmatism (mm), and distortion (%) of the imaging lens in Example 5. As shown in FIG. 10, each aberration is corrected properly.

In Example 5, the total track length is 4.4 mm and the total length to diagonal ratio is 0.75, suggesting that the imaging lens is low-profile. The imaging lens also offers brightness with an F-value of 2.24 and a wide field of view of about 74 degrees.

Table 6 shows data on Examples 1 to 5 in relation to the conditional expressions (1) to (12).

TABLE 6

| | Example 1 | Example 2 | Example 3 | Example 4 | Example 5 |
|---|---|---|---|---|---|
| Conditional Expression (1) TTL/2ih | 0.74 | 0.74 | 0.74 | 0.75 | 0.75 |
| Conditional Expression (2) Nd3 | 1.64 | 1.64 | 1.64 | 1.64 | 1.64 |
| Conditional Expression (3) \|r9/r10\| | 8.57 | 11.71 | 7.91 | 5.26 | 5.52 |
| Conditional Expression (4) \|r2/r1\| | 5.62 | 6.15 | 5.70 | 4.50 | 4.47 |
| Conditional Expression (5) f2/f | −1.10 | −1.12 | −1.08 | −1.05 | −1.08 |
| Conditional Expression (6) vd1 | 55.57 | 55.57 | 55.57 | 55.57 | 55.57 |
| Conditional Expression (7) vd2 | 23.25 | 23.25 | 23.25 | 23.25 | 23.25 |
| Conditional Expression (8) f1/f4 | 0.98 | 1.00 | 0.95 | 1.26 | 1.19 |
| Conditional Expression (9) r3/r4 | −0.84 | −1.00 | −0.92 | −1.09 | −1.21 |
| Conditional Expression (10) r7/r8 | 2.01 | 2.01 | 1.98 | 2.75 | 2.69 |
| Conditional Expression (11) vd4 | 55.66 | 55.66 | 55.66 | 55.66 | 55.66 |
| Conditional Expression (12) vd5 | 55.66 | 55.66 | 55.66 | 55.66 | 55.66 |

As explained above, the imaging lenses according to the examples of the present invention are low-profile enough to meet the growing demand for low-profileness, with total track length TTL of 4.5 mm or less and a total length to diagonal ratio of 0.8 or less, though they use five constituent lenses. In addition, these imaging lenses offer a wide field of view of 74 degrees and brightness with an F-value of 2.5 or less, and correct various aberrations properly and can be supplied at low cost.

When any one of the imaging lenses composed of five constituent lenses according to the examples of the present invention is used in an optical system built in an image pickup device mounted in an increasingly compact and low-profile mobile terminal such as a smartphone, mobile phone or PDA (Personal Digital Assistant), or a game console or an information terminal such as a PC, or a home appliance with a camera function, it delivers high camera performance and contributes to the low-profileness of the image pickup device.

The effects of the present invention are as follows.

According to the present invention, there is provided a compact low-cost imaging lens which meets the demand for low-profileness and offers brightness with an F-value of 2.5 or less and a wide field of view and corrects various aberrations properly.

What is claimed is:

1. An imaging lens which forms an image of an object on a solid-state image sensor and provides brightness with an F-value of 2.5 or less, in which elements are arranged in order from an object side to an image side, comprising:
   an aperture stop;
   a first lens having positive refractive power and a convex surface on the object side;
   a second lens having negative refractive power and a concave surface on the image side;
   a third lens having positive refractive power, a convex surface on the object side, a concave surface on the image side and at least one aspheric surface;
   a fourth lens as a meniscus double-sided aspheric lens having positive refractive power and a convex surface on the image side; and
   a fifth lens as a double-sided aspheric lens having negative refractive power, a concave surface on the object side and a concave surface on the image side,
   wherein the aspheric image-side surface of the fifth lens has a pole-change point off an optical axis,
   and conditional expressions (1) and (10) below are satisfied:

$$TTL/2ih0.8 \qquad (1)$$

$$1.98 \leq r7/r8 < 3.0 \qquad (10)$$

where
   TTL: total track length
   ih: maximum image height
   r7: curvature radius of the object-side surface of the fourth lens
   r8: curvature radius of the image-side surface of the fourth lens.

2. The imaging lens according to claim 1, wherein conditional expressions (2) and (3) below are satisfied:

$$1.60 < Nd3 < 1.70 \qquad (2)$$

$$4.0 < |r9/r10| < 14.0 \qquad (3)$$

where
   Nd3: refractive index of the third lens at d-ray
   r9: curvature radius of the object-side surface of the fifth lens
   r10: curvature radius of the image-side surface of the fifth lens.

3. The imaging lens according to claim 1, wherein a conditional expression (4) below is satisfied:

$$3.5 < |r2/r1| \qquad (4)$$

where
   r1: curvature radius of the object-side surface of the first lens
   r2: curvature radius of the image-side surface of the first lens.

4. The imaging lens according to claim 1, wherein a conditional expression (5) below is satisfied:

$$-1.5 < f2/f < -0.5 \qquad (5)$$

where
   f: focal length of an overall optical system of the imaging lens
   f2: focal length of the second lens.

5. The imaging lens according to claim 1, wherein conditional expressions (6) and (7) below are satisfied:

$$45 < vd1 < 75 \qquad (6)$$

$$20 < vd2 < 35 \qquad (7)$$

where
   vd1: Abbe number of the first lens at d-ray
   vd2: Abbe number of the second lens at d-ray.

6. The imaging lens according to claim 1, wherein a conditional expression (8) below is satisfied:

$$0.5 < f1/f4 < 1.8 \qquad (8)$$

where
   f1: focal length of the first lens
   f4: focal length of the fourth lens.

7. The imaging lens according to claim 1, wherein a conditional expression (9) below is satisfied:

$$-1.3 < r3/r4 < -0.7 \qquad (9)$$

where
   r3: curvature radius of the object-side surface of the second lens
   r4: curvature radius of the image-side surface of the second lens.

8. The imaging lens according to claim 1, wherein conditional expressions (11) and (12) below are satisfied:

$$45 < vd4 < 75 \qquad (11)$$

$$45 < vd5 < 75 \qquad (12)$$

where
   vd4: Abbe number of the fourth lens at d-ray
   vd5: Abbe number of the fifth lens at d-ray.

9. An imaging lens which forms an image of an object on a solid-state image sensor and provides brightness with an F-value of 2.5 or less, in which elements are arranged in order from an object side to an image side, comprising:
   an aperture stop;
   a first lens having positive refractive power and a convex surface on the object side;
   a second lens having negative refractive power;
   a third lens having negative refractive power, a convex surface on the object side and at least one aspheric surface;
   a fourth lens as a meniscus double-sided aspheric lens having positive refractive power and a convex surface on the image side; and
   a fifth lens as a double-sided aspheric lens having negative refractive power, a concave surface on the object side and a concave surface on the image side, wherein the aspheric image-side surface of the fifth lens has a pole-change point off an optical axis,
and conditional expressions (1) and (3) below are satisfied:

$$TTL/2ih \leq 0.8 \qquad (1)$$

$$4.0 < |r9/r10| < 14.0 \qquad (3)$$

where
TTL: total track length
ih: maximum image height
r9: curvature radius of the object-side surface of the fifth lens
r10: curvature radius of the image-side surface of the fifth lens.

10. The imaging lens according to claim 9, wherein a conditional expression (2) below is satisfied:

$$1.60 < Nd3 < 1.70 \qquad (2)$$

where
Nd3: refractive index of the third lens at d-ray.

11. The imaging lens according to claim 9, wherein a conditional expression (4) below is satisfied:

$$3.5 < |r2/r1| \qquad (4)$$

where
r1: curvature radius of the object-side surface of the first lens
r2: curvature radius of the image-side surface of the first lens.

12. The imaging lens according to claim 9, wherein a conditional expression (5) below is satisfied:

$$-1.5 < f2/f < -0.5 \qquad (5)$$

where
f: focal length of an overall optical system of the imaging lens
f2: focal length of the second lens.

13. The imaging lens according to claim 9, wherein conditional expressions (6) and (7) below are satisfied:

$$45 < vd1 < 75 \qquad (6)$$

$$20 < vd2 < 35 \qquad (7)$$

where
vd1: Abbe number of the first lens at d-ray
vd2: Abbe number of the second lens at d-ray.

14. The imaging lens according to claim 9, wherein a conditional expression (8) below is satisfied:

$$0.5 < f1/f4 < 1.8 \qquad (8)$$

where
f1: focal length of the first lens
f4: focal length of the fourth lens.

15. The imaging lens according to claim 9, wherein a conditional expression (9) below is satisfied:

$$-1.3 < r3/r4 < -0.7 \qquad (9)$$

where
r3: curvature radius of the object-side surface of the second lens
r4: curvature radius of the image-side surface of the second lens.

16. The imaging lens according to claim 9, wherein a conditional expression (10) below is satisfied:

$$1.5 < r7/r8 < 3.0 \qquad (10)$$

where
r7: curvature radius of the object-side surface of the fourth lens
r8: curvature radius of the image-side surface of the fourth lens.

17. The imaging lens according to claim 9, wherein conditional expressions (11) and (12) below are satisfied:

$$45 < vd4 < 75 \qquad (11)$$

$$45 < vd5 < 75 \qquad (12)$$

where
vd4: Abbe number of the fourth lens at d-ray
vd5: Abbe number of the fifth lens at d-ray.

* * * * *

UNITED STATES PATENT AND TRADEMARK OFFICE
CERTIFICATE OF CORRECTION

PATENT NO.         : 9,541,739 B2
APPLICATION NO.    : 15/040568
DATED              : January 10, 2017
INVENTOR(S)        : Masaya Hashimoto Page 1 of 1

It is certified that error appears in the above-identified patent and that said Letters Patent is hereby corrected as shown below:

In the Claims

Column 21, Line 45:
Currently reads: TTL/2ih0.8
Should read: TTL/2ih≤0.8

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*